United States Patent
Walls

(10) Patent No.: US 6,372,069 B1
(45) Date of Patent: Apr. 16, 2002

(54) PRODUCT AND METHOD FOR USED TIRES

(76) Inventor: Dennis P. Walls, 4822 Fosterburg Rd., Alton, IL (US) 62002

( * ) Notice: Subject to any disclaimer, the term of this patent is extended or adjusted under 35 U.S.C. 154(b) by 0 days.

(21) Appl. No.: 09/383,616

(22) Filed: Aug. 26, 1999

(51) Int. Cl.[7] ............................................. B32B 35/00
(52) U.S. Cl. .................. 156/95; 264/36.14; 264/912; 428/903.3
(58) Field of Search ..................... 156/95; 83/951; 428/903.3; 264/36.14, 912; 47/902; 119/222

(56) References Cited

U.S. PATENT DOCUMENTS

| | | | |
|---|---|---|---|
| 5,096,772 A | * 3/1992 | Snyder | 428/295 |
| 5,246,754 A | 9/1993 | Miller | 428/36.91 |
| 5,340,630 A | * 8/1994 | Tripp | 428/54 |
| 5,360,286 A | * 11/1994 | Russell | 404/6 |
| 5,472,750 A | 12/1995 | Miller | 428/2 |

* cited by examiner

Primary Examiner—Geoffrey L. Knable
(74) Attorney, Agent, or Firm—Don W. Weber

(57) ABSTRACT

A method for utilizing discarded tires is disclosed which creates strong, durable, posts, beams, mats, blocks or other structures. Used tires are cut and flattened and the sidewalls are removed. The tread sections of the tires are cleaned. Vulcanizing compound is then applied to adjacent inner surfaces of the tread sections to form a flat essential building element. These building elements may be vulcanized together in alternating horizontal and perpendicular layers to form flat blocks, mats, noise or safety barriers, or other structures. The essential building elements are flat and form structures which have flat upper and lower surfaces and a rectangular cross-section. Beams may be formed by securing a number of the essential building elements together to form structures that are approximately 8 feet high and have a rectangular cross-section.

2 Claims, 2 Drawing Sheets

PRODUCT AND METHOD FOR USED TIRES

BACKGROUND OF THE INVENTION

This invention relates to a method for making new products from used tires. In particular, the method produces a flat, elongated product made from used tires which may be used for posts, landscaping tiles, roadway bridges and other useful products.

Millions of steel-belted tires are discarded by the consuming public each year. Fees are now being charged in order to dispose of these tires, which have become a major environmental problem. Since used tires are not biodegradable, they survive in the environment for hundreds or even thousands of years. Special dumping areas for these discarded tires have been created, although this only partially solves the problem of the accumulation of millions of tires each year. It would be most helpful if these used tires could be converted into useful products. It is an object of this invention to provide a new method to produce new products which utilize used tires as a raw material.

It has been known in the prior art to convert used tires into cylindrical poles or other cylindrical devices. For example, U.S. Pat. No. 5,246,754 issued to Edward Miller in 1993, describes a general purpose construction element such as a post, pole, or beam that is constructed from discarded used tire casings. While the method creates a cylindrical post or pole made from used tires, the method described in Miller and the end product have certain inherent limitations. For example, the posts or beams described in Miller are all cylindrical, and hence could not be utilized for flat walls, flat posts, or other types of construction elements requiring a square or rectangular cross-section.

Miller improved upon his first patent with a 1995 patent which described a construction block element made from used tire casings. In this patent, U.S. Pat. No. 5,472,750, Miller disclosed that tires may be cut into mats which can be stacked and secured into blocks by means of straps. The main reason for the creation of the blocks is for transportation, although Miller did envision that the blocks, as secured by adhesives, bands, or pins, could be used as building blocks for other construction applications. Miller does not make any accommodation for long, rectangular shaped mats or blocks or for tall rectangular-shaped posts. It is an object of this invention to utilize used tires to create long or tall posts or blocks having a rectangular cross-section.

It is a still further object of this invention to provide a method and resultant product for creating flat, wide blocks and mats and flat, strong, posts or rails having a rectangular cross-section and being held together without the use of adhesives, bands, or pins.

Since the raw materials for creating this new product (used tires) are readily available, the new products created herein for landscaping, roofs, roadway uses, posts or other barriers, would be inexpensive to produce. In addition, the general environment would be greatly enhanced by returning this heretofore non-usable discarded tire to a useful purpose.

Other and further object of this invention will become apparent upon reading the below described Specification.

BRIEF DESCRIPTION OF THE PREFERRED EMBODIMENT

A used tire is first prepared for remanufacture by cutting the generally toroidal shaped tire across the tread and sidewalls. The tire is then stretched out and laid generally flat. The sidewalls are then removed from both sides of the tread, leaving an approximately 6 to 6½ inch wide tread surface section. The inside of the tire is then thoroughly cleaned. A second tire is similarly cut and prepared. A vulcanizing compound is then applied to the inside surface of each tire tread section and these inside surfaces are pressed together. The flattened tire tread sections are then held together for approximately four hours under approximately 3,000 pounds of pressure. The two tire thread portions, now joined by vulcanizing, create a flat building block element. Elements may be joined together in various patterns, for example, with each successive layer being turned perpendicular to the longitudinal axis of the layer below. These building element sections can create long, narrow beams with a rectangular cross section for posts or landscape rails.

A number of these structures can be laid together in alternating perpendicular fashion to create large, strong mats, or blocks of varying sizes. The vulcanizing method creates a strong bond and straps, other adhesives or pins are not required in order to create these construction blocks and posts having a generally rectangular cross-section.

DETAILED DESCRIPTION OF THE PREFERRED EMBODIMENT

Used tires are known throughout the industry and a detailed description of their design and construction is well known in the art. Most of these tires comprise a rubberized main body with steel belts within the body.

Figure 1:
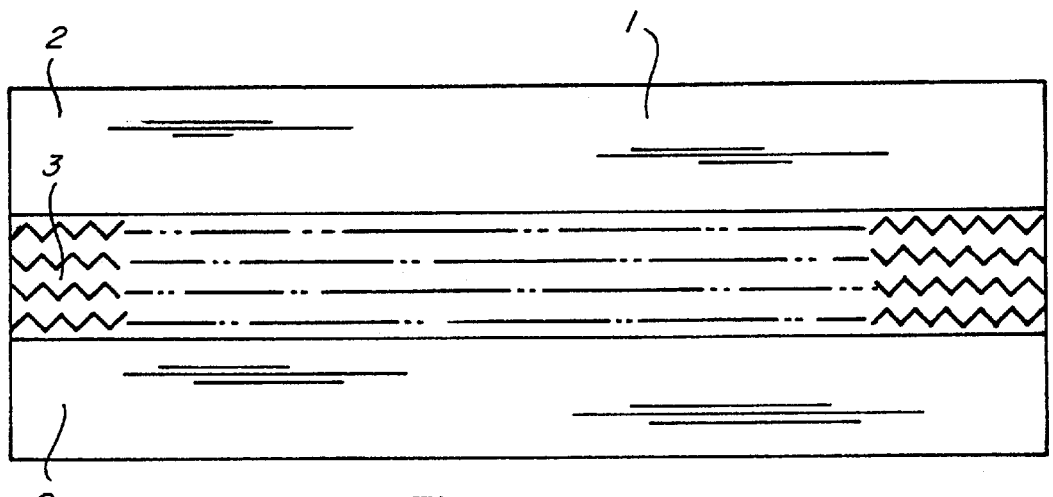
FIG. 1 is a top view of the discarded tire after it has been cut and laid flat.

These tires may be readily cut by conventional means, although a cutter similar to a large paper cutter is preferred. In practicing this method, a cut across the generally rounded cross-section is made. The tire is then stretched out along its circumference and flattened by applying a small amount of pressure. This generally rectangular flattened tire 1 is best shown in FIG. 1.

The flattened tire includes upper and lower sidewall sections 2 and a central tread section 3. This tread section 3 is most suitable for constructing the mats, posts, blocks and beams described below. The sidewalls can be used to form bricks, which are generally 3 inches wide and 6 inches long.

Figure 2:
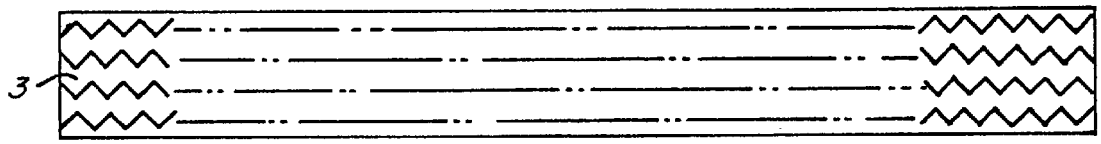
FIG. 2 is a top view of the tire after the sidewalls have been removed, leaving the tread.

The second step in this method is to use a cutting technique to cut the sidewalls 2 off both sides of the tread section 3. The cutter takes the form of a long, weighted cutting edge and a surface to support the tire. This results in a tread section 3, as shown in FIGS. 1 and 2. In the standard tire, this tread section is approximately 6 to 6½ inches wide and is approximately 6 to 8 feet in length.

The next step is to thoroughly clean the inside of the tire. The inside of the tire is the surface opposite the tread surface. As shown on FIG. 3, the inside surface 4 of the lower tire 5 is exposed. Cleaning the tire thoroughly is desirable, but is not absolutely required.

Figure 3:
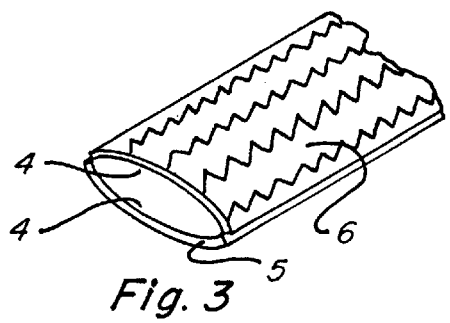
FIG. 3 is a partial perspective view of two tires having their inside surfaces adjacent to one another before the pressure step.

After cutting and cleaning another tire as above, a vulcanizing compound is applied to the inside surfaces 4 of the lower tire 5 and the upper tire 6. At this point, the upper and lower tread sections are aligned such that their longitudinal axis coincide and the left 7 and right 8 edges of the upper and lower tread sections are in alignment and form a smooth, regular edge. The combined tread sections are slightly bowed, as shown in FIG. 3.

The final step in producing the essential building elements of this invention is to apply equal pressure to the tread sides of the upper and lower tread sections. This equal, flat pressure applied equally to the upper and lower surfaces of the tread sections will produce a flat, elongated essential building element.

Figure 4:
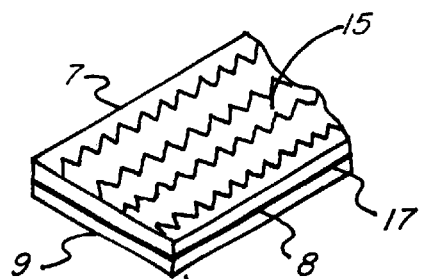
FIG. 4 is a partial perspective view of the two flattened tire treads shown in FIGS. 2 and 3 which have been permanently joined together by the vulcanizing and pressurizing method.

A partial view of the finished building element is shown at FIG. 4. The flat, long essential building element has a rectangular cross-section throughout the longitudinal length of the element. This building element creates a flat upper surface 15, a flat lower surface 16, and flat sides 17. The sides are smooth and regular throughout and have no indentations or voids. The upper and lower surfaces are parallel to each other and perpendicular to the sides. Because the two tread surfaces have been joined by vulcanizing, rather than by use of adhesive or other securing means, the essential building element thus produced is very strong and flat.

This method creates a strong, flat, element which may then be further fashioned into rails, posts, blocks, or other useful structures. The essential building element is the long, flat, vulcanized tread section shown in partial perspective view on FIG. 4. These essential building elements are approximately 6 to 6½ inches wide and 6 to 8 feet long.

This same process can be used with the removed sidewalls, resulting in a shape that is approximately 6 to 8 feet long. However, the sidewall building elements would have a width of approximately 3 inches due to limitations in the sidewall structure of the tire. In practice, it has been found that the desired length of the sidewall building elements is 6 inches, or about the same as a clay brick. The sidewall elements are produced in a similar four-step method as the tread elements.

Another useful step in this process is to join the essential building elements 9 into useable flat shapes such as mats, blocks or posts.

The essential building elements 9 may be built up by arranging these building elements in a laminated, or cross-configured shape. A number of building elements 9 may be vulcanized together as shown in FIG. 5.

Figure 5:
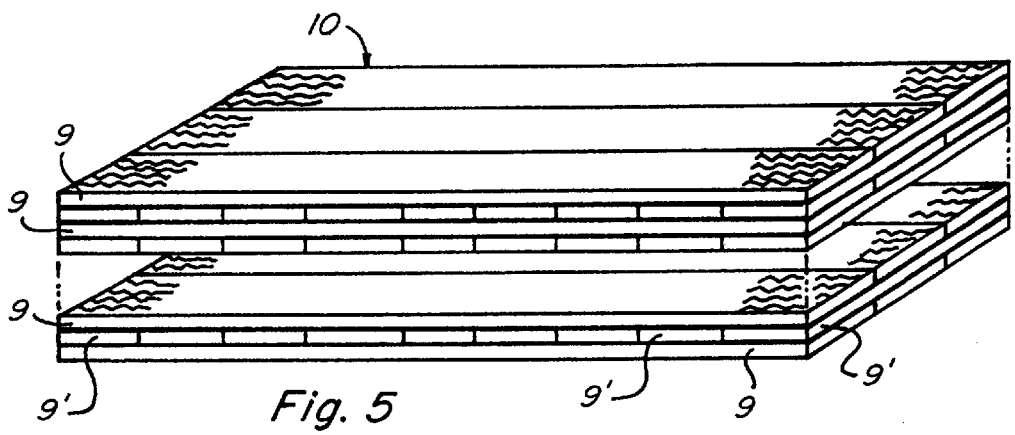
FIG. 5 is a narrow mat or rail embodiment of this device, showing a number of tire treads joined together to form a mat or rail.

The bridge railing shown in FIG. 5 comprises a number of horizontal building elements 9 laid side-by-side alternating in rows of perpendicular building elements 9', also laid side-by-side. The side-by-side essential building elements shown in FIG. 4 have the longitudinal axis of each row of building elements arranged perpendicular to the longitudinal axis of the row of building elements located one layer directly below.

Each row of essential building elements is secured to the row above it by the vulcanizing method previously described. A vulcanizing compound is applied to each tread surface of each essential building element. The tread surfaces are then pressed together with the longitudinal axis of each successive layer being perpendicular to the longitudinal axis of the layer below it. When the tread surfaces with the vulcanizing compound are pressed together and held under pressure for approximately four hours, the essential building elements are transformed into strong yet flat mats, blocks or barriers as shown in FIG. 5. Although perpendicular axis are preferred, a successive row that has an axis at any oblique angle to the axis of the row below it would also be consistent with this disclosure.

Figure 6:
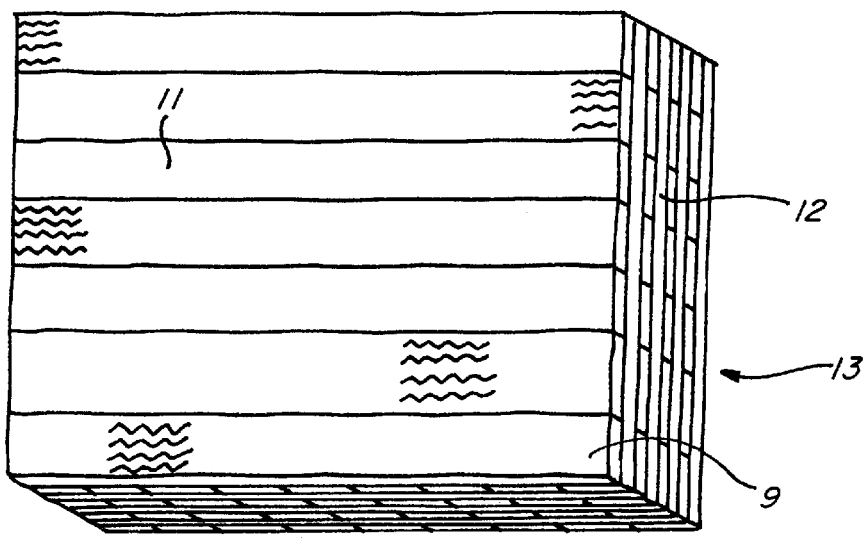
FIG. 6 is a perspective view of a number of tire tread sections joined together to form a safety or noise barrier block.
Figure 7:
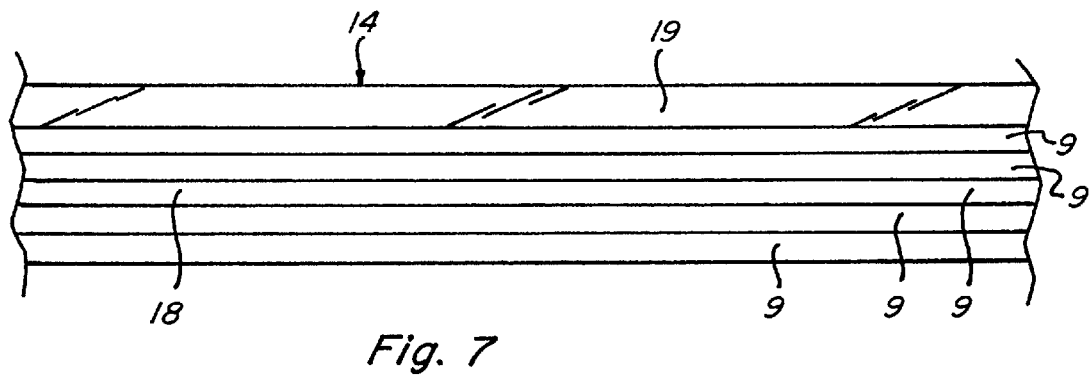
FIG. 7 is a partial perspective view of a number of tire tread sections joined together to form a highway sign post or landscape tie.

This process, as shown in FIGS. 5, 6 and 7 is capable of producing a large variety of structures useful in many different fields and trades. For example, the structure illustrated in FIG. 5 could be suitably used as a bridge railing for a roadway. These bridge railing sections 10 could be laid end-to-end to form a long bridge railing. The sturdy construction of the essential building element 9, including rubber reinforced by steel-belts, and joined together by vulcanizing would be quite durable to the weather and would be strong for purposes of reducing damage or loss of life on bridges. Many other useful applications of the essential bridge railing section 10 are within the contemplation and spirit of this disclosure.

Yet another use for a structure composed of building elements 9 and 9' is illustrated in FIG. 6. Because these essential building elements are strong and reinforced with steel, they may be utilized as safety barriers or as noise barriers. The reinforced steel rubber construction makes any structure built from these essential building elements quite strong and durable. The nature of the rubber also provides for a great deal of noise reduction. Arranging these building elements 9 in alternating perpendicular rows, as shown in FIG. 6, can create a rectangular noise or safety barrier having flat rectangular surfaces 11 and having flat rectangular sides 12. The cross-section of this embodiment would be rectangular throughout. Once again, the horizontal rows 9 alternate with perpendicular rows 9' to form the safety barrier or noise barrier blocks 13. The rows are secured together by the vulcanizing method described above.

Other structures which may be readily formed from the essential building elements shown in FIG. 4 are the elongated highway sign posts or beams shown in FIG. 7. These beams 14 consist of a number of essential building elements 9 stacked on one another to form an elongated beam. The central longitudinal axis of each essential building element is aligned such that the sides of the beam 18 are coincident, smooth, regular and flat and perpendicular to the flat upper 19 and lower surfaces of the beam. These beams would have a regular, rectangular cross-section throughout the longitudinal length of the beam. Each beam 14 would be approximately 6 to 8 feet tall and would have a width of approximately 6 to 8 inches. Any number of building elements could be utilized to make the beam any thickness desired.

In the beam embodiment, the horizontal beams 9 are formed together by the cleaning, vulcanizing, and pressing method described above. These beams are quite useful for a variety of purposes. For example, the embodiment shown in FIG. 7 could be utilized as a highway sign post, by securing the longitudinal axis of the beam vertically. If the longitudinal axis of the beam is horizontal, as shown in FIG. 7, this beam structure 14 could be utilized as a landscape tie, narrow guide rail, or in any of a variety of uses. The use of the structure 14, shown and described herein, has a wide variety of applications, all of which are within the scope and disclosure of this invention.

Construction blocks similar in size and shape to concrete building blocks or bricks may also be constructed by cutting the tread or sidewall building elements to the desired dimensions. For example, a concrete building block type structure could be created by combining a plurality of the essential building elements which are then cut to form building blocks approximately 12 inches wide, 12 inches high and 24 inches long. Structures with the approximate dimensions of a clay brick (6 inches long, 4 inches wide and 3 inches deep) are most suitably made from sidewall building elements. Further, these flat structures can be made in a wide variety of lengths, widths and depths to accommodate practically any type of structure required in the construction or other trades, such as roofs, driveways or patio blocks.

Obviously, many variations of the embodiments described herein are still within the keeping and disclosure of this device. The essential building element is flat, having a rectangular cross-section, and a long longitudinal length. Thousands of composite structures made from the essential building elements shown in FIG. 4 can be manufactured and are within the spirit and disclosure of this device.

I claim:

1. A method of producing a useful structure from used tires having a tread section and a sidewall section comprising the steps of:

(a) Cutting a plurality of tires across their cross-sections;
 (b) Cutting the sidewalls from said tires, creating two sidewall sections;
 (c) Cleaning the inner surface of the sidewall sections of each tire thoroughly;
 (d) Applying a vulcanizing compound to the inner surface of said sidewall sections of each tire;
 (e) Pressing the inner surface of two of said sidewall sections, having said vulcanizing compound applied, together, to form a flat, elongated essential sidewall building element structure;
 (f) Cutting said elongated essential sidewall building element structure into building elements that are approximately six inches long and three inches wide;
 (g) Applying a vulcanizing compound to the outer surfaces of a plurality of said essential sidewall building element structures;
 (h) Pressing a plurality of said essential sidewall building elements, having said vulcanizing compound applied, together, using approximately 3,000 psi for approximately four hours, to form a brick structure having flat, parallel upper and lower surfaces and flat, smooth regular sides and ends.

2. A method of producing a useful structure from used tires, comprising the steps of:

(a) Cutting a plurality of tires across their cross-sections;
 (b) Cutting the sidewalls from said tires, thereby creating a sidewall strip of six to eight feet;
 (c) Cutting said sidewall strip so that the resulting width of said strip is approximately three inches;
 (d) Applying a vulcanizing compound to the inner surfaces of each sidewall strip,
 (e) Pressing the inner surfaces of two sidewall strips, having said vulcanizing compound applied, together, at 3,000 psi for four hours;
 (f) Cutting said elongated six to eight foot strips into sidewall building elements that are approximately six inches long and three inches wide;
 (g) Applying a vulcanizing compound to the outer surfaces of a plurality of said sidewall building elements;
 (h) Pressing a plurality of said sidewall building elements, having said vulcanizing compound applied, together, at 3,000 psi for four hours, to form a brick structure having flat, parallel upper and lower surfaces and flat, smooth regular sides and ends.

* * * * *